US011635822B2

(12) United States Patent
Miyano

(10) Patent No.: US 11,635,822 B2
(45) Date of Patent: Apr. 25, 2023

(54) DISPLAY DEVICE, DISPLAY METHOD, AND RECORDING MEDIUM HAVING DISPLAY PROGRAM RECORDED THEREIN

(71) Applicant: SHARP KABUSHIKI KAISHA, Sakai (JP)

(72) Inventor: Yasuhiro Miyano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/586,279

(22) Filed: Jan. 27, 2022

(65) Prior Publication Data

US 2022/0253147 A1 Aug. 11, 2022

(30) Foreign Application Priority Data

Feb. 10, 2021 (JP) .............................. JP2021-019996

(51) Int. Cl.
| | |
|---|---|
| *G06F 3/01* | (2006.01) |
| *G06F 3/04842* | (2022.01) |
| *G06F 3/0482* | (2013.01) |
| *G06F 3/04817* | (2022.01) |
| *G06V 40/20* | (2022.01) |

(52) U.S. Cl.
CPC ............ *G06F 3/017* (2013.01); *G06F 3/0482* (2013.01); *G06F 3/04817* (2013.01); *G06F 3/04842* (2013.01); *G06V 40/28* (2022.01)

(58) Field of Classification Search
CPC .... G06F 3/017; G06F 3/04817; G06F 3/0482; G06F 3/04842; G06V 40/28
See application file for complete search history.

(56) References Cited

U.S. PATENT DOCUMENTS

| | | | | |
|---|---|---|---|---|
| 6,266,057 | B1* | 7/2001 | Kuzunuki | G06F 3/033 |
| | | | | 707/999.102 |
| 2009/0073117 | A1* | 3/2009 | Tsurumi | G06F 3/0481 |
| | | | | 345/158 |
| 2009/0079813 | A1* | 3/2009 | Hildreth | G06F 3/017 |
| | | | | 348/E7.078 |
| 2018/0275767 | A1* | 9/2018 | Hildreth | G06F 3/048 |
| 2022/0255995 | A1* | 8/2022 | Berliner | G06T 15/20 |

FOREIGN PATENT DOCUMENTS

JP H09-185456 A 7/1997

* cited by examiner

*Primary Examiner* — Cao H Nguyen
(74) *Attorney, Agent, or Firm* — ScienBiziP, P.C.

(57) ABSTRACT

A display device includes an input operation detector that detects an input operation including a gesture operation, a display processor that displays an input operation icon in a first display form when a first gesture operation is detected and displays the input operation icon in a second display form when a second gesture operation is detected, a reception processor that receives a movement operation when the first gesture operation is detected and receives a selection operation when the second gesture operation is detected, and a change processor that, when a third gesture operation is detected, gradually or continuously changes a display form of the input operation icon between the first display form and the second display form.

11 Claims, 11 Drawing Sheets

DISPLAY DEVICE, DISPLAY METHOD, AND RECORDING MEDIUM HAVING DISPLAY PROGRAM RECORDED THEREIN

INCORPORATION BY REFERENCE

This application is based upon and claims the benefit of priority from the corresponding Japanese Patent Application No. 2021-019996 filed on Feb. 10, 2021, the entire contents of which are incorporated herein by reference.

BACKGROUND

The present disclosure relates to a display device that receives a non-contact input operation of a user for a display screen, a display method, and a recording medium having a display program recorded therein.

There is a conventionally known display device that allows an input operation (screen operation) such as an instruction operation without touching a display screen of a display panel. For example, there is a known interface device in which, when the user forms the shape of one finger by hand toward the device, the icon of number "1" is presented on the display and the display of the TV, which is a first menu, is highlighted, and when the user forms the shape of two fingers by hand, the icon of number "2" is presented on the display and the display of the network, which is a second menu, is highlighted, and the same shape of the hand is maintained for a certain period of time so that the first menu or the second menu is selected.

Here, in the above-described system where the user performs an input operation by hand without touching the display screen, the icon of number "1" is presented on the display when the user performs a first gesture operation (forms the shape of one finger by hand) and the icon of number "2" is presented on the display when the user performs a second gesture operation (forms the shape of two fingers by hand) so that it is possible to recognize which gesture operation is being performed by the user.

However, in an ambiguous gesture state, such as an intermediate state between the first gesture operation and the second gesture operation, it is difficult for the user to recognize the current gesture state of his/her own. For example, it is assumed that the user performs the operation to gradually change the shape of the hand from the intermediate gesture operation state between the first gesture operation and the second gesture operation and change the shape of the hand to the state of the first gesture operation or the second gesture operation. In such a case, in the intermediate gesture operation state, the user cannot recognize how close the current gesture operation state is to either the first gesture operation or the second gesture operation, and therefore, it is difficult to determine the timing in which the intermediate gesture operation state is changed to the state of the first gesture operation or the second gesture operation. Therefore, there has been a problem of an improper input contrary to the user's intention, for example the first gesture operation or the second gesture operation is performed at timing earlier or later than the timing intended by the user.

SUMMARY

An object of the present disclosure is to provide a display device, a display method, and a recording medium having a display program recorded therein, which may prevent an improper input by a gesture operation of a user in a display device that receives a non-contact input operation of the user to a display screen.

A display device according to one aspect of the present disclosure is a display device that receives a non-contact input operation of a user for a display screen, and the device includes an input operation detector that detects an input operation including a predetermined gesture operation of the user, a display processor that displays an input operation icon in a first display form on the display screen when the input operation detector detects a first gesture operation of the user and displays the input operation icon in a second display form on the display screen when the input operation detector detects a second gesture operation of the user, a reception processor that receives a movement operation to move the input operation icon in accordance with the first gesture operation when the input operation detector detects the first gesture operation and receives a selection operation to select a selection target by the input operation icon when the input operation detector detects the second gesture operation, and a change processor that, when the input operation detector detects a third gesture operation of the user, gradually or continuously changes a display form of the input operation icon between the first display form and the second display form.

A display method according to another aspect of the present disclosure is a display method for receiving a non-contact input operation of a user for a display screen, and the display method causes one or more processors to execute detecting an input operation including a predetermined gesture operation of the user, displaying an input operation icon in a first display form on the display screen when a first gesture operation of the user is detected and displaying the input operation icon in a second display form on the display screen when a second gesture operation of the user is detected, receiving a movement operation to move the input operation icon in accordance with the first gesture operation when the first gesture operation is detected and receiving a selection operation to select a selection target by the input operation icon when the second gesture operation is detected, and gradually or continuously changing, when a third gesture operation of the user is detected, a display form of the input operation icon between the first display form and the second display form.

A recording medium according to another aspect of the present disclosure is a recording medium having recorded therein a display program that receives an non-contact input operation of a user for a display screen, and the program causes one or more processors to execute detecting an input operation including a predetermined gesture operation of the user, displaying an input operation icon in a first display form on the display screen when a first gesture operation of the user is detected and displaying the input operation icon in a second display form on the display screen when a second gesture operation of the user is detected, receiving a movement operation to move the input operation icon in accordance with the first gesture operation when the first gesture operation is detected and receiving a selection operation to select a selection target by the input operation icon when the second gesture operation is detected, and gradually or continuously changing, when a third gesture operation of the user is detected, a display form of the input operation icon between the first display form and the second display form.

According to the present disclosure, it is possible to provide a display device, a display method, and a recording medium having a display program recorded therein, which may prevent an improper input by a gesture operation of a user in a display device that receives a non-contact input operation of the user to a display screen.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure is described below with reference to the accompanying drawings. The embodiment below is an example obtained by embodying the present disclosure and does not intend to limit the technical scope of the present disclosure.

Figure 1:
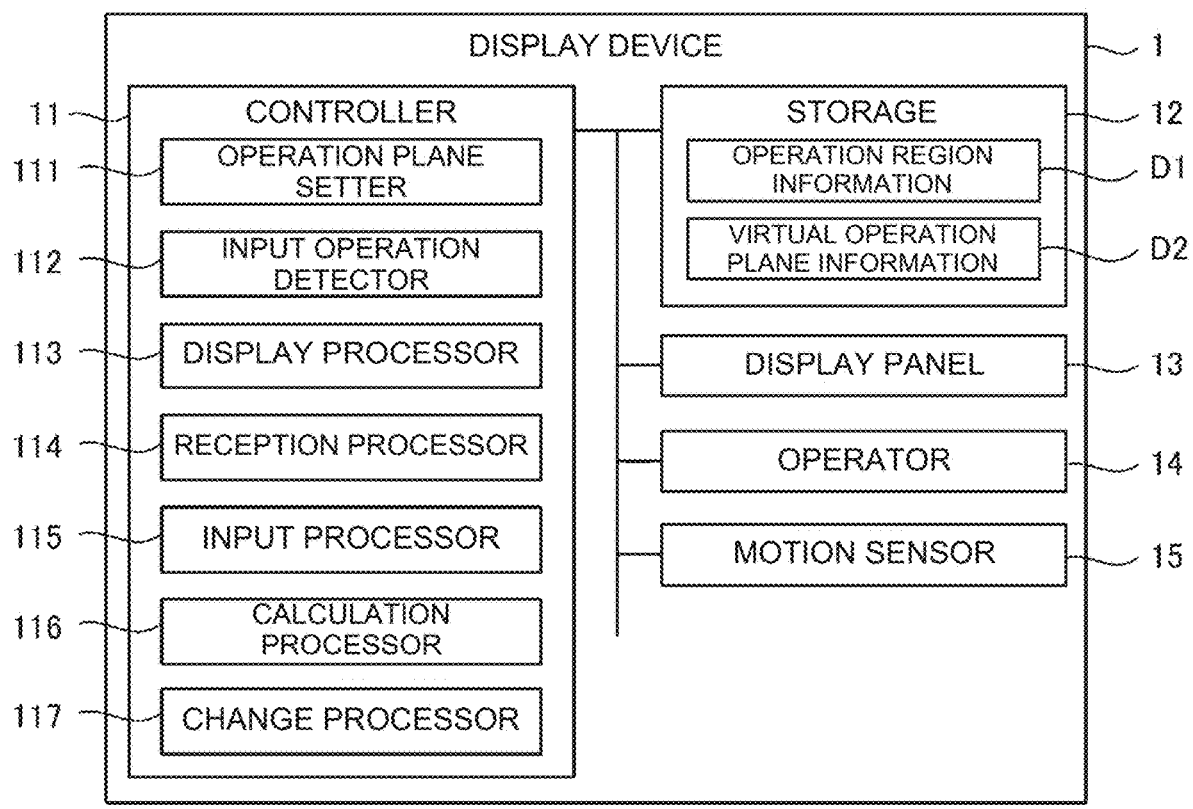
FIG. 1 is a block diagram illustrating a configuration of a display device according to an embodiment of the present disclosure.
Figure 2:
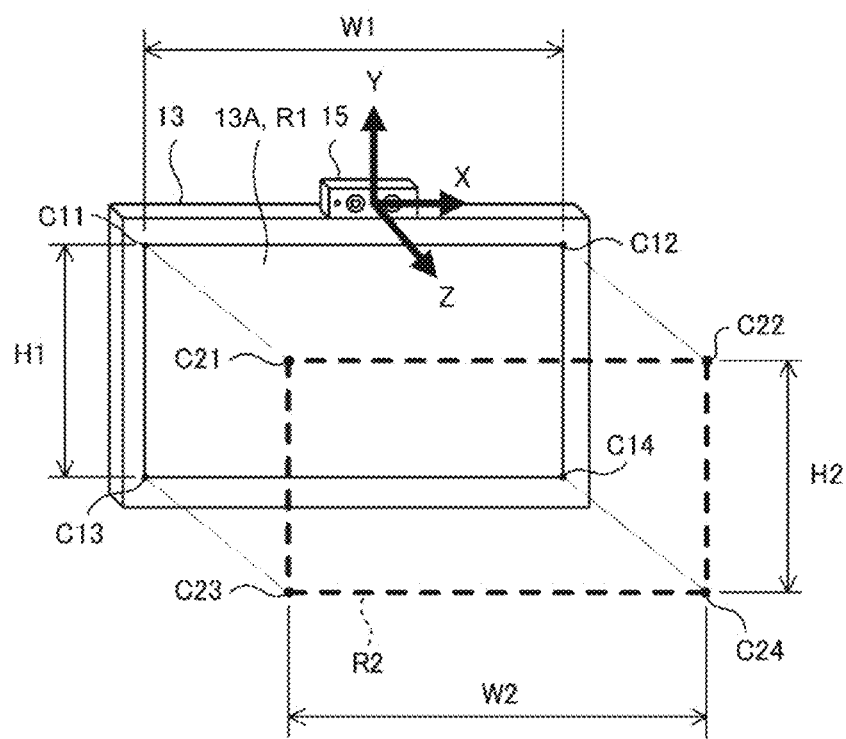
FIG. 2 is a schematic diagram illustrating an example of a virtual operation plane in the display device according to the embodiment of the present disclosure.

As illustrated in FIG. 1, a display device 1 according to an embodiment of the present disclosure includes a controller 11, a storage 12, a display panel 13, an operator 14, and a motion sensor 15. FIG. 2 is a schematic diagram of the display device 1. The motion sensor 15 is installed at the top of the display panel 13 to detect an input operation of a user.

The display device 1 receives a non-contact input operation by the user to a display screen 13A. For example, when detecting the input operation of the user on a virtual operation plane R2, the display device 1 executes an input process corresponding to the input operation of the user for the display screen 13A. For example, when the user performs an operation to touch a predetermined position of the virtual operation plane R2, the display device 1 detects the position on the display screen 13A corresponding to the touch position on the virtual operation plane R2 to receive the touch input. A specific configuration of the display device 1 is described below.

The motion sensor 15 includes, for example, two cameras and three infrared LEDs to detect the input operation of the user within a predetermined detection range. The motion sensor 15 outputs detection information to the controller 11. The detection information includes position coordinates (an X-coordinate, a Y-coordinate, and a Z-coordinate) of a detection target (e.g., the user's hand, fingertip, stylus pen, or pointer) with respect to the motion sensor 15. The motion sensor 15 is capable of detecting, for example, the back (palm) of the user's hand (a right hand RH and a left hand LH), the joints of the fingers, and the skeleton, angle, position, and the like, of the hand and fingers. A well-known technique is applicable to the motion sensor 15.

The display panel 13 is a display that presents images, for example, a liquid crystal display. The operator 14 is an operating device such as a mouse and a keyboard. The operator 14 may include a touch panel.

The storage 12 is a non-volatile storage such as a hard disk drive (HDD) or a solid state drive (SSD) which stores various types of information. Specifically, the storage 12 stores data such as operation region information D1 and virtual operation plane information D2.

The operation region information D1 is information indicating an operation region R1 on the display screen 13A of the display panel 13. The operation region R1 is a region of the display screen 13A where the user may perform an input operation via the virtual operation plane R2, that is, a region that may receive the input operation of the user. The operation region R1 may be set on the entire region of the display screen 13A or may be set on a partial region of the display screen 13A. For example, when the entire region of the display screen 13A is set as the operation region R1, the operation region information D1 includes, as the coordinate information defining the operation region R1, information on coordinates C11 to C14 (see FIG. 2) of the four corners of the display screen 13A. The operation region information D1 is registered in the storage 12 each time the operation region R1 is set or updated.

The virtual operation plane information D2 is information indicating a region of the virtual operation plane R2 that receives the input operation of the user for the display screen 13A. Specifically, the virtual operation plane R2 corresponds to the operation region R1, and coordinates C21 to C24 (see FIG. 2) of the four corners defining the virtual operation plane R2 correspond to the coordinates C11 to C14 defining the operation region R1. The virtual operation plane information D2 includes information on the coordinates C21 to C24 of the four corners defining the virtual operation plane R2. The virtual operation plane information D2 is registered in the storage 12 each time the virtual operation plane R2 is set or updated. The size and position of the virtual operation plane R2 may be previously set or may be set by an operation of the user.

The storage 12 stores a control program such as a display control program for causing the controller 11 to execute a display control process (see FIG. 8) described below. For example, the display control program is recorded in a non-transitory manner in a computer-readable recording medium such as a CD or a DVD, is read by a reading device (not illustrated) such as a CD drive or a DVD drive included in the display device 1, and is stored in the storage 12. The display control program may be distributed from a cloud server and stored in the storage 12.

The controller 11 includes control devices such as a CPU, a ROM, and a RAM. The CPU is a processor that performs various arithmetic operations. The ROM is a non-volatile storage that previously stores a control program such as BIOS and OS for causing the CPU to execute various arithmetic operations. The RAM is a volatile or non-volatile storage that stores various types of information and is used as a temporary storage memory (working area) for various processes executed by the CPU. The controller 11 causes the CPU to execute various control programs that are previously stored in the ROM or the storage 12 to control the display device 1.

According to a conventional technique, when the user performs an input operation by hand without touching the display screen 13A, the user moves the hand to move a mouse pointer (an input operation icon P1) displayed on the display screen 13A to a desired position. Furthermore, according to a conventional technique, for example, a mouse pointer movement operation is received when the user performs a first gesture operation by hand, and a mouse pointer selection operation (click operation) is received when the user performs a second gesture operation by hand. In this case, a problem occurs, for example, although the user intends to perform the first gesture operation, the state of the first gesture operation becomes ambiguous, and thus the second gesture operation is received despite the user's intention. A specific example of this problem is described below.

Figure 3:
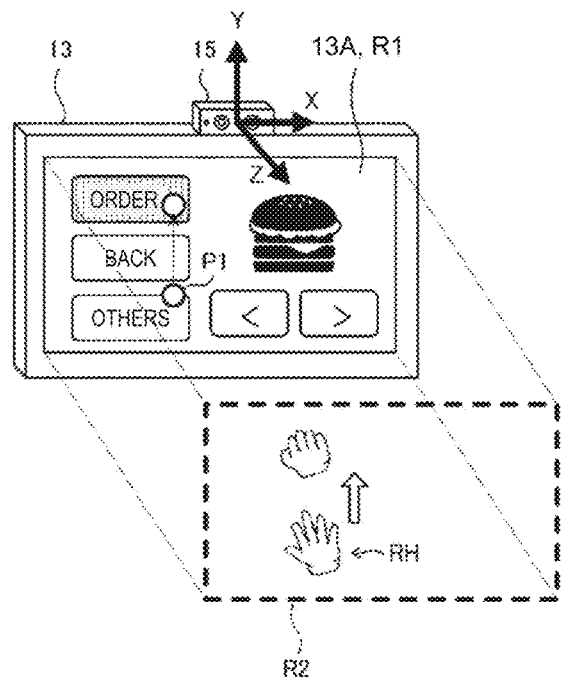
FIG. 3 is a diagram illustrating an example of an input operation in a conventional display device.
Figure 4:
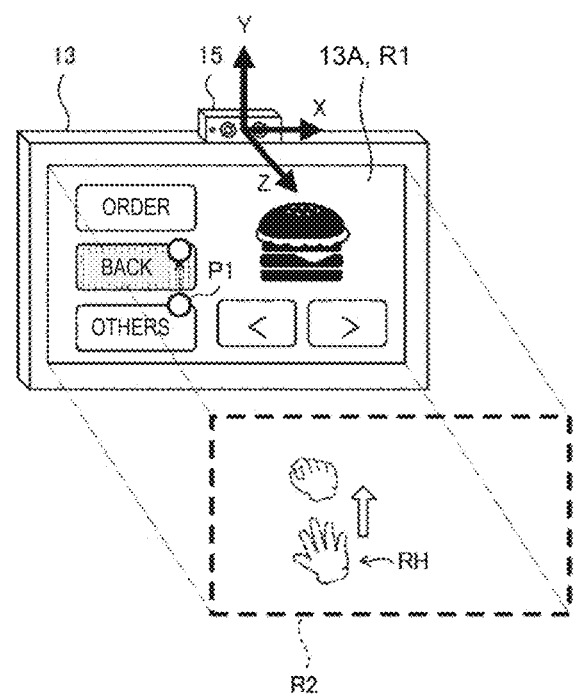
FIG. 4 is a diagram illustrating an example of an input operation in a conventional display device.

FIGS. 3 and 4 are diagrams illustrating the above-described problem caused by the conventional techniques. For example, when a product order screen illustrated in FIG. 3 displays selection button images of "Order", "Back", and "Others" as the images to be selected, the user performs the operation (the first gesture operation) to hold the palm of the right hand RH on the virtual operation plane R2 to the display screen 13A and moves the right hand RH in vertical and horizontal directions (an X-direction and a Y-direction) so that the input operation icon P1 on the display screen 13A moves in accordance with the movement operation. To order the desired product, the user performs the operation (the second gesture operation) to clench the right hand RH while the input operation icon P1 is overlapped with the selection button image of "Order" so as to press the selection button image of "Order" displayed on the display screen 13A. This allows the user to perform the operation to select (order) the desired product.

However, as illustrated in FIG. 4, in the middle of moving the opened palm of the right hand RH on the virtual operation plane R2 in the vertical and horizontal directions (the X-direction and the Y-direction), the user may involuntarily lose the posture of the right hand RH (the first gesture operation) due to tiredness of the right hand RH, or the like, and move toward the posture of clenching the fist. In this case, when the second gesture operation is detected, an operation not intended by the user, for example, the operation to press the selection button image of "Back", is received. As described above, the conventional technique may cause an improper input due to the gesture operation of the user. Conversely, the display device 1 according to the present embodiment may prevent an improper input due to the gesture operation of the user as described below.

Specifically, as illustrated in FIG. 1, the controller 11 includes various processors such as an operation plane setter 111, an input operation detector 112, a display processor 113, a reception processor 114, an input processor 115, a calculation processor 116, and a change processor 117. The controller 11 executes various processes in accordance with the display control program by the CPU to function as the operation plane setter 111, the input operation detector 112, the display processor 113, the reception processor 114, the input processor 115, the calculation processor 116, and the change processor 117. All or some of the processors included in the controller 11 may be configured with electronic circuits. The display control program may be a program that causes a plurality of processors to function as the various processors.

The operation plane setter 111 sets the virtual operation plane R2 that receives the input operation of the user. For example, as illustrated in FIG. 2, the operation plane setter 111 sets the virtual operation plane R2 at a position away from the display screen 13A by a predetermined distance in a Z-direction. The operation plane setter 111 may set the virtual operation plane R2 having a preset size at a preset position or may set the virtual operation plane R2 having a size corresponding to the user's operation at a position specified by the user. Although details will be described below (see "the method for setting the virtual operation plane"), for example, the user may perform a predetermined gesture operation to set the virtual operation plane R2 having a desired size at a desired position.

The input operation detector 112 detects input operations including predetermined gesture operations of the user. Specifically, the input operation detector 112 detects the input operation of the user on the virtual operation plane R2 that is set by the operation plane setter 111. For example, the input operation detector 112 detects the detection coordinates on the virtual operation plane R2 based on the detection information acquired from the motion sensor 15 and calculates the input coordinates in the operation region R1 from the detection coordinates. The input operations include a gesture operation to execute a predetermined input process, a drawing operation to draw a handwritten image on the display screen 13A, etc. The input operation detector 112 is an example of an input operation detector according to the present disclosure.

Here, when it is assumed that the ratio of the virtual operation plane R2 to the operation region R1 is "W2: W1=H2:H1=a:b" (see FIG. 2), the input operation detector 112 may calculate input coordinates [dx, dy] by equations of dx=sx×b/a and dy=sy×b/a based on the detection coordinates [sx, sy] on the virtual operation plane R2. A display resolution [rx, ry] is Min [dx, dy]=[0, 0] and Max [dx, dy]=[dx, dy].

A specific example of the case where the input operation detector 112 detects the gesture operation is described here.

For example, when the user wants to move the input operation icon P1 (e.g., a mouse cursor image) displayed on the display screen 13A, the user performs the first gesture operation. The first gesture operation is, for example, the user's operation to open the right hand RH (e.g., the operation to form the shape of "flat hand" by the right hand RH) in front of the display screen 13A. For example, when the user wants to select (click) a selection target with the input operation icon P1 displayed on the display screen 13A, the user performs the second gesture operation. The second gesture operation is, for example, the user's operation to clench the right hand RH (e.g., the operation to form the shape of "closed fist" by the right hand RH) in front of the display screen 13A. The input operation detector 112 detects the first gesture operation and the second gesture operation.

The combination of the first gesture operation and the second gesture operation is not limited to the example described above. For example, the first gesture operation may be the posture of holding up the index finger of the right hand RH, and the second gesture operation may be the posture of clenching the right hand RH. The first gesture operation may be the posture of holding up the opened right hand RH in a vertical direction, and the second gesture operation may be the posture of tilting the opened right hand RH at a 90-degree angle. The first gesture operation may be the posture of opening the right hand RH, and the second gesture operation may be the posture of holding up the thumb of the right hand RH or the posture of forming an OK sign by the right hand RH.

The input operation detector 112 detects a third gesture operation that approximates (is similar to) the first gesture operation and the second gesture operation. The third gesture operation is, for example, a gesture operation in the middle of changing from the first gesture operation to the second gesture operation, e.g., the shape of gesture between the shape of "flat hand" and the shape of "closed fist" of the right hand RH. For example, when the user puts the strength into the right hand RH to form the shape of "flat hand" (the first gesture operation) and then loses the strength of the right hand RH, the shape of "flat hand" collapses and becomes close to the shape of "closed fist" (the second gesture operation).

The input operation detector 112 detects the first gesture operation, the second gesture operation, and the third gesture operation based on hand and finger information on at least any of the skeleton, angle, and position of the hand and fingers of the user. The input operation detector 112 detects the first gesture operation, the second gesture operation, and the third gesture operation based on a degree of clenching Gn (described below) of the hand in accordance with the hand and finger information. For example, the input operation detector 112 previously sets a first threshold for the degree of clenching Gn corresponding to the first gesture operation and detects the first gesture operation when the detected degree of clenching Gn is less than the first threshold. For example, the input operation detector 112 previously sets a second threshold (here, the first threshold<the second threshold) for the degree of clenching Gn corresponding to the second gesture operation and detects the second gesture operation when the detected degree of clenching Gn is equal to or more than the second threshold.

The input operation detector 112 detects the third gesture operation when the detected degree of clenching Gn is equal to or more than the first threshold and less than the second threshold.

The storage 12 previously stores setting information that associates a predetermined gesture operation and operation content corresponding to the gesture operation. For example, the first gesture operation and the third gesture operation are associated with a movement operation of the input operation icon P1, and the second gesture operation is associated with a selection operation (click operation) by the input operation icon P1. The predetermined gesture operation may include a gesture operation (see "the method for setting the virtual operation plane" below) for setting the virtual operation plane R2. The predetermined gesture operation may be set individually for each user using the display device 1.

The display processor 113 displays various types of information on the display screen 13A of the display panel 13. For example, the display processor 113 displays, on the display screen 13A, an image of the input operation icon P1 (a mouse cursor image), an image of a selection target that is selectable by operating the input operation icon P1 by the user (e.g., the selection button images of "Order", "Back", and "Others" in FIG. 3), etc.

The display processor 113 displays, on the display screen 13A, the input operation icon P1 in a first display form when the input operation detector 112 detects the first gesture operation of the user. The display processor 113 displays, on the display screen 13A, the input operation icon P1 in a second display form when the input operation detector 112 detects the second gesture operation of the user.

Figure 5:
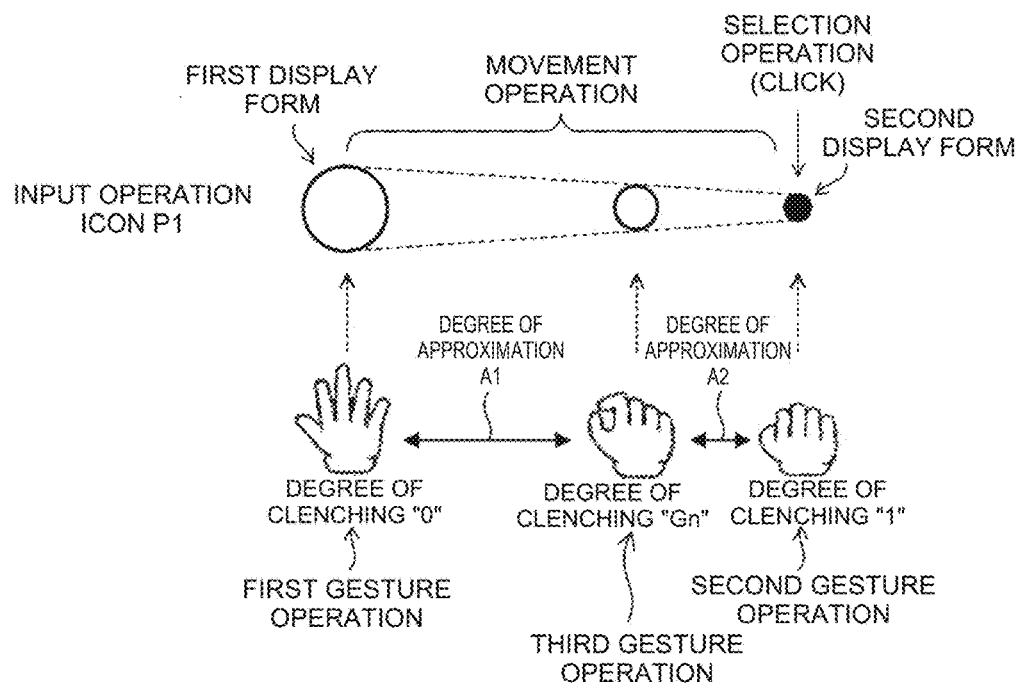
FIG. 5 is a diagram illustrating gesture operations in the display device and changes in a display form of an input operation icon according to the embodiment of the present disclosure.

For example, as illustrated in FIG. 5, when the input operation detector 112 detects the first gesture operation (the posture of "flat hand") of the user, the display processor 113 displays the input operation icon P1 in a first size (dimensions) and in a first color (white). Conversely, when the input operation detector 112 detects the second gesture operation (the posture of "closed fist") of the user, the display processor 113 displays the input operation icon P1 in a second size smaller than the first size and in a second color (black). The display processor 113 is an example of a display processor according to the present disclosure.

The reception processor 114 receives a non-contact input operation by the user for the display screen 13A. Specifically, the reception processor 114 receives the movement operation to move the input operation icon P1 in accordance with the first gesture operation when the input operation detector 112 detects the first gesture operation, and receives the selection operation to select the selection target by the input operation icon P1 when the input operation detector 112 detects the second gesture operation. When the input operation detector 112 detects the third gesture operation, the reception processor 114 receives the movement operation to move the input operation icon P1 in accordance with the third gesture operation. For example, the reception processor 114 refers to the setting information stored in the storage 12 to receive the input operation corresponding to the predetermined gesture operation. The reception processor 114 is an example of a reception processor according to the present disclosure.

The input processor 115 performs an input process corresponding to the input operation received by the reception processor 114. Specifically, when the movement operation and the selection operation are received, the input processor 115 performs the input process corresponding to the input operation of the user for the display screen 13A. For example, when the reception processor 114 receives the movement operation, the input processor 115 moves the input operation icon P1 on the display screen 13A. For example, when the reception processor 114 receives the selection operation, the input processor 115 performs the process corresponding to the selection target on the display screen 13A. For example, when the reception processor 114 receives the operation of selecting the selection button image of "Order" on the display screen 13A, the input processor 115 executes the order process assigned to the selection button image of "Order". When the reception processor 114 receives the drawing operation, the input processor 115 performs the drawing process to draw a handwritten image on the display screen 13A. The input processor 115 is an example of an input processor according to the present disclosure.

When the input operation detector 112 detects the third gesture operation of the user, the calculation processor 116 calculates the degree of approximation between the third gesture operation and the first gesture operation and between the third gesture operation and the second gesture operation. The calculation processor 116 calculates the degree of approximation based on the hand and finger information. The degree of approximation is an index indicating the degree of clenching Gn of the user's hand.

For example, as illustrated in FIG. 5, the degree of clenching Gn is set to "0" (or 0 to 0.1) for the first gesture operation (the operation to open the hand), and the degree of clenching Gn is set to "1" (or 0.9 to 1) for the second gesture operation (the operation to clench the hand). The storage 12 previously stores the information on the degrees of clenching Gn corresponding to the first gesture operation and the second gesture operation, respectively. Here, when the input operation detector 112 detects the third gesture operation of the user, the calculation processor 116 calculates the degree of clenching Gn corresponding to the third gesture operation based on the hand and finger information on at least any of the skeleton, angle, and position of the hand and fingers of the user. The degree of clenching Gn closer to "0" indicates that the third gesture operation approximates the first gesture operation, and the degree of clenching Gn closer to "1" indicates that the third gesture operation approximates the second gesture operation. The calculation processor 116 calculates a degree of approximation A1 between the first gesture operation and the third gesture operation and a degree of approximation A2 between the second gesture operation and the third gesture operation based on the degree of clenching Gn corresponding to the third gesture operation.

The change processor 117 changes the display form of the input operation icon P1 based on the degree of approximation calculated by the calculation processor 116. In other words, the change processor 117 changes the display form of the input operation icon P1 based on the degree of clenching Gn calculated by the calculation processor 116. Specifically, the change processor 117 changes the size of the input operation icon P1 based on the degrees of approximation A1 and A2 calculated by the calculation processor 116 or the degree of clenching Gn.

For example, the change processor 117 approximates the size of the input operation icon P1 to the size (the first display form) of the input operation icon P1 corresponding to the first gesture operation as the degree of approximation A1 between the first gesture operation and the third gesture operation is larger or as the degree of approximation A2 between the second gesture operation and the third gesture operation is smaller.

For example, the change processor 117 approximates the size of the input operation icon P1 to the size (the second display form) of the input operation icon P1 corresponding to the second gesture operation as the degree of approximation A2 between the second gesture operation and the third gesture operation is larger or as the degree of approximation A1 between the first gesture operation and the third gesture operation is smaller. That is, the change processor 117 approximates the size of the input operation icon P1 to the first display form as the degree of clenching Gn of the user's hand is smaller and approximates the size of the input operation icon P1 to the second display form as the degree of clenching Gn of the user's hand is larger. Thus, the change processor 117 changes the size of the input operation icon P1 to the size corresponding to the degree of approximation A1 or A2 or the degree of clenching Gn.

According to another embodiment, the change processor 117 may change the color of the input operation icon P1 based on the degrees of approximation A1 and A2 calculated by the calculation processor 116 or the degree of clenching Gn.

For example, the change processor 117 approximates the color of the input operation icon P1 to the color (the first display form) of the input operation icon P1 corresponding to the first gesture operation as the degree of approximation A1 between the first gesture operation and the third gesture operation is larger or as the degree of approximation A2 between the second gesture operation and the third gesture operation is smaller.

For example, the change processor 117 approximates the color of the input operation icon P1 to the color (the second display form) of the input operation icon P1 corresponding to the second gesture operation as the degree of approximation A2 between the second gesture operation and the third gesture operation is larger or as the degree of approximation A1 between the first gesture operation and the third gesture operation is smaller. That is, the change processor 117 approximates the color of the input operation icon P1 to the first display form as the degree of clenching Gn of the user's hand is smaller and approximates the color of the input operation icon P1 to the second display form as the degree of clenching Gn of the user's hand is larger. As described above, the change processor 117 changes the color of the input operation icon P1 to the color corresponding to the degree of approximation A1 or A2 or the degree of clenching Gn. For example, the change processor 117 may change the color of the input operation icon P1 from black to red as the degree of approximation A2 increases. In this case, the change processor 117 may set the common size of the input operation icon P1 for the first gesture operation, the second gesture operation, and the third gesture operation.

According to another embodiment, the change processor 117 may change the shape of the input operation icon P1 based on the degrees of approximation A1 and A2 calculated by the calculation processor 116 or the degree of clenching Gn.

For example, the change processor 117 approximates the shape of the input operation icon P1 to the shape (the first display form) of the input operation icon P1 corresponding to the first gesture operation as the degree of approximation A1 between the first gesture operation and the third gesture operation is larger or as the degree of approximation A2 between the second gesture operation and the third gesture operation is smaller.

For example, the change processor 117 approximates the shape of the input operation icon P1 to the shape (the second display form) of the input operation icon P1 corresponding to the second gesture operation as the degree of approximation A2 between the second gesture operation and the third gesture operation is larger or as the degree of approximation A1 between the first gesture operation and the third gesture operation is smaller. That is, the change processor 117 approximates the shape of the input operation icon P1 to the first display form as the degree of clenching Gn of the user's hand is smaller and approximates the shape of the input operation icon P1 to the second display form as the degree of clenching Gn of the user's hand is larger. As described above, the change processor 117 changes the shape of the input operation icon P1 to the shape corresponding to the degree of approximation A1 or A2 or the degree of clenching Gn. For example, the change processor 117 may change the shape of the input operation icon P1 from a "circular" shape to a "square" shape as the degree of approximation A2 increases.

The change processor 117 may simultaneously change at least two elements out of the size, color, and shape of the input operation icon P1 based on the degrees of approximation A1 and A2 calculated by the calculation processor 116 or the degree of clenching Gn.

As illustrated in FIG. 5, the change processor 117 gradually or continuously changes the display form of the input operation icon P1 between the first display form and the second display form based on the degrees of approximation A1 and A2 calculated by the calculation processor 116 or the degree of clenching Gn. Thus, the input operation icon P1 changes smoothly in appearance on the display screen 13A.

Figure 6:
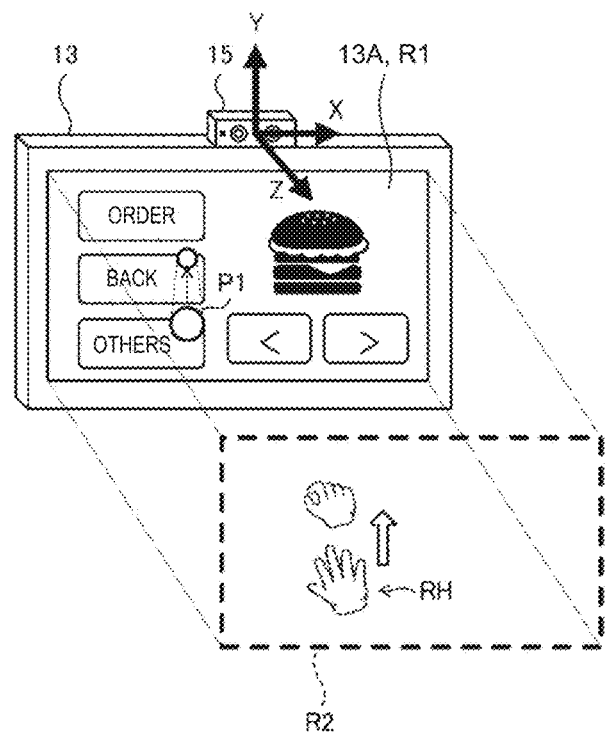
FIG. 6 is a diagram illustrating an example of an input operation in the display device according to the embodiment of the present disclosure.
Figure 7:
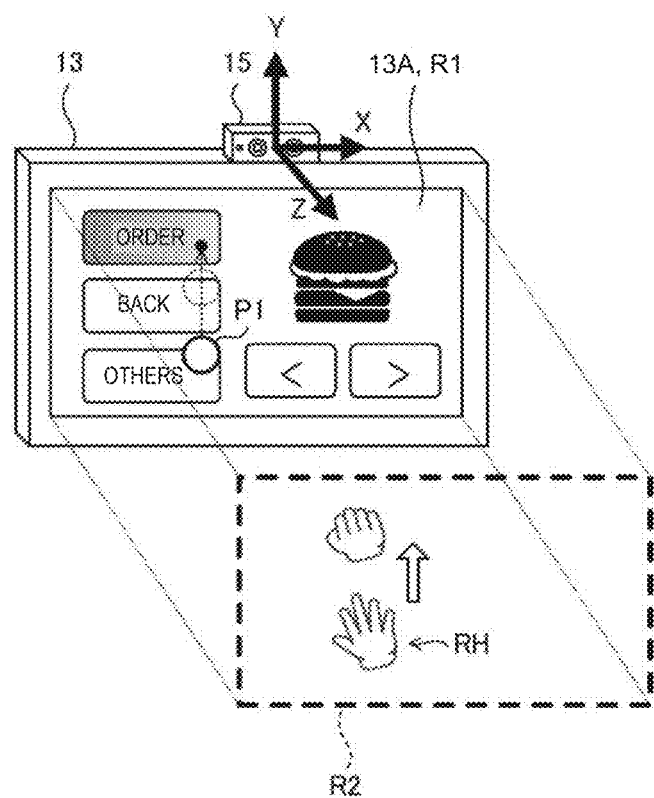
FIG. 7 is a diagram illustrating an example of an input operation in the display device according to the embodiment of the present disclosure.

With the above-described configuration, for example, as illustrated in FIG. 6, when the third gesture operation corresponding to the right hand RH of the user is detected, the size of the input operation icon P1 displayed on the display screen 13A is changed to the size corresponding to the degrees of approximation A1 and A2 of the third gesture operation. This allows the user to recognize that the right hand RH of the user is becoming close to the shape (the shape of the clenched hand) corresponding to the second gesture operation (selection operation) from the shape (the shape of the opened hand) corresponding to the first gesture operation. Thus, the user may return the right hand RH to the shape corresponding to the first gesture operation again, which may thus prevent improper input due to an operation not intended by the user (here, the selection operation of "Back"). Then, as illustrated in FIG. 7, the user moves the input operation icon P1 to the target position ("Order") while keeping the shape of the right hand RH in the state of the first gesture operation, and performs the second gesture operation at the position where the input operation icon P1 is overlapped with "Order" so as to perform the target operation (the selection operation of "Order").

Display Control Process

Figure 8:
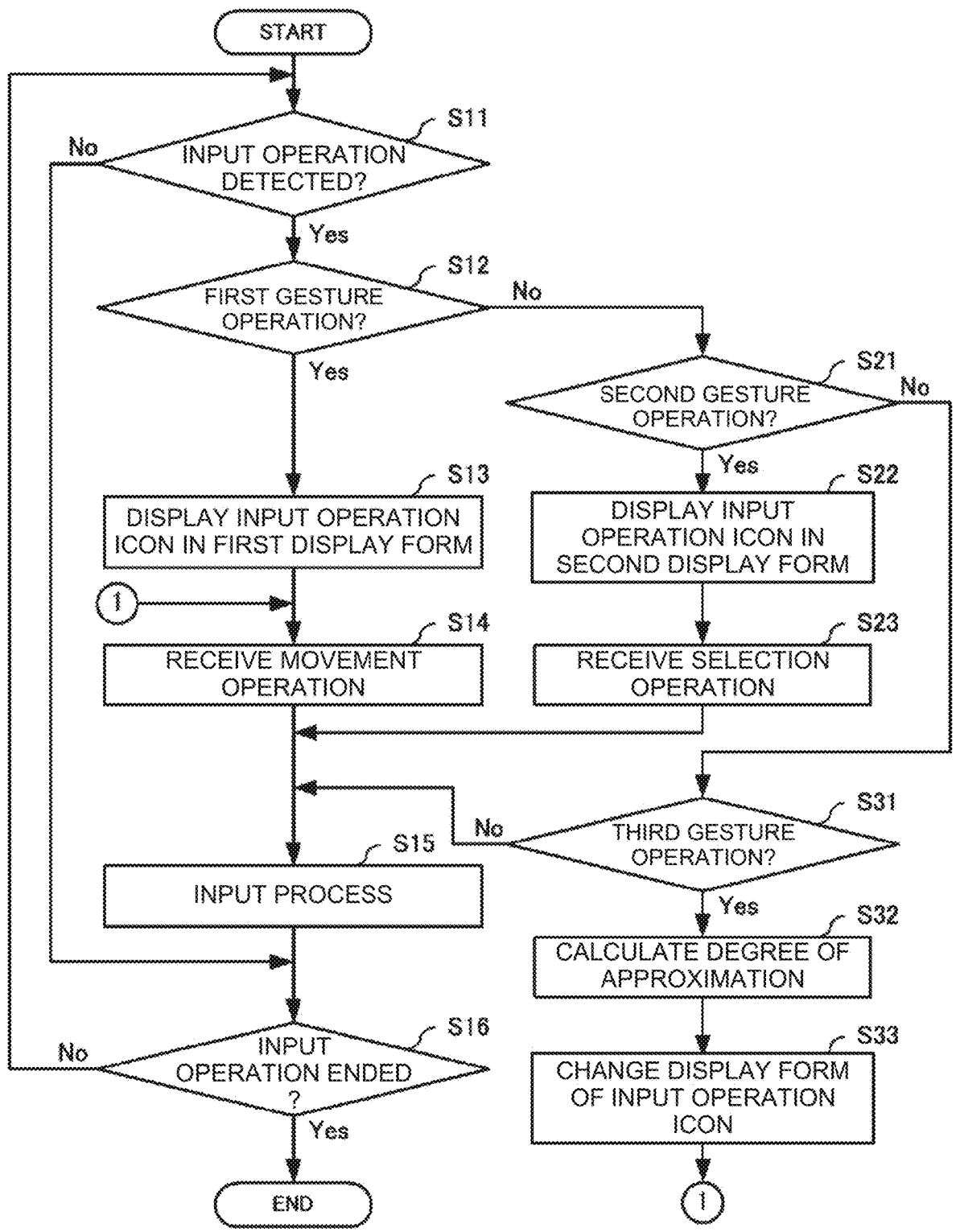
FIG. 8 is a flowchart illustrating an example of a procedure of a display control process to be performed by the display device according to the embodiment of the present disclosure.

A display control process to be executed by the controller 11 of the display device 1 is described below with reference to FIG. 8.

The present disclosure may be regarded as disclosure of a display control method (an example of a display method according to the present disclosure) for executing one or more steps included in the display control process, and one or more steps included in the display control process described herein may be omitted as appropriate. The steps of the display control process may be executed in a different order as long as the similar function effect is produced. In an example of the case described here, the controller 11 executes each step of the display control process; however, a display control method in which a plurality of processors executes the steps of the display control method in a distributed manner is also regarded as another embodiment.

First, at Step S11, the controller 11 determines whether the input operation of the user has been detected. Specifically, the controller 11 detects the input operation of the user on the virtual operation plane R2. For example, the controller 11 detects the detection coordinates on the virtual operation plane R2 based on the detection information acquired from the motion sensor 15 and calculates the input coordinates in the operation region R1 of the display screen 13A from the detection coordinates. When the controller 11 has detected the input operation (S11: Yes), the process proceeds to Step S12. When the controller 11 has not detected the input operation (S11: No), the process proceeds to Step S16.

At Step S12, the controller 11 determines whether the first gesture operation of the user has been detected. For example, the controller 11 determines whether the operation to open the right hand RH of the user (the operation to form the shape of "flat hand" by the right hand RH) has been detected based on the hand and finger information. When the controller 11 has detected the first gesture operation of the user (S12: Yes), the process proceeds to Step S13. Conversely, when the controller 11 has not detected the first gesture operation of the user (S12: No), the process proceeds to Step S21. Steps S11 and S12 are examples of an input operation detection step according to the present disclosure.

Subsequently, at Step S13, the controller 11 displays the input operation icon P1 in the first display form on the display screen 13A. For example, the controller 11 displays the input operation icon P1 in the first size and in the first color (white) on the display screen 13A (see FIG. 5). Step S13 is an example of a display step according to the present disclosure.

Subsequently, at Step S14, the controller 11 receives a movement operation of the input operation icon P1. For example, when the user moves the right hand RH in the vertical and horizontal directions (the X-direction and the Y-direction) while opening the right hand RH (the first gesture operation) on the virtual operation plane R2, the controller 11 receives the movement operation. Step S14 is an example of a reception step according to the present disclosure.

Subsequently, at Step S15, the controller 11 performs the input process corresponding to the movement operation of the user for the display screen 13A. For example, the controller 11 moves the input operation icon P1 displayed on the display screen 13A so as to follow the movement of the right hand RH of the user.

Subsequently, at Step S16, the controller 11 determines whether the input operation has ended. When the input operation has ended (S16: Yes), the controller 11 ends the display control process. When the input operation has not ended (S16: No), the controller 11 returns to Step S11.

When the process returns to Step S11, the controller 11 performs the operations at Steps S11 and S12 again. At Step S12, when the controller 11 has not detected the first gesture operation (S12: No), the process proceeds to Step S21. At Step S21, the controller 11 determines whether the second gesture operation (the operation to close the right hand RH) of the user has been detected. When the controller 11 has not detected the second gesture operation (S21: No), the process proceeds to Step S31.

Here, as an example, a case where the user unintentionally performs the third gesture operation after performing the first gesture operation is described.

At Step S31, the controller 11 determines whether the third gesture operation (the operation to form the shape between "flat hand" and "closed fist" by the right hand RH) of the user has been detected. For example, when the user gradually closes the right hand RH in the middle of moving the input operation icon P1 by the opened right hand RH, the controller 11 detects the third gesture operation based on the hand and finger information (S31: Yes). Step S31 is an example of an input operation detection step according to the present disclosure.

When the third gesture operation has been detected (S31: Yes), at Step S32, the controller 11 calculates the degrees of approximation A1 and A2 between the third gesture operation and the first gesture operation and between the third gesture operation and the second gesture operation. For example, the controller 11 calculates the degrees of approximation A1 and A2 based on the degree of clenching Gn of the user's hand.

Specifically, based on the degree of clenching Gn corresponding to the third gesture operation, the controller 11 calculates the degree of approximation A1 between the first gesture operation and the third gesture operation and the degree of approximation A2 between the second gesture operation and the third gesture operation (see FIG. 5). Step S32 is an example of a calculation step according to the present disclosure.

Subsequently, at Step S33, the controller 11 changes the display form of the input operation icon P1 based on the calculated degrees of approximation A1 and A2. In other words, the controller 11 changes the display form of the input operation icon P1 based on the calculated degree of clenching Gn. Specifically, the controller 11 gradually or continuously changes at least any of the size, color, and shape of the input operation icon P1 between the first display form and the second display form based on the calculated degrees of approximation A1 and A2 or the degree of clenching Gn. Step S33 is an example of a change step according to the present disclosure.

Subsequently, the process proceeds to Step S14, and the controller 11 receives the movement operation of the input operation icon P1. Specifically, when the user moves the right hand RH in the vertical and horizontal directions (the X-direction and the Y-direction) while keeping the right hand RH half-closed (the third gesture operation) on the virtual operation plane R2, the controller 11 receives the movement operation.

As described above, when the user is performing the third gesture operation between the first gesture operation and the second gesture operation, the controller 11 moves the input operation icon P1 displayed on the display screen 13A so as to follow the movement of the right hand RH of the user (see FIG. 6).

Subsequently, for example, when the user performs the operation to close the right hand RH (the second gesture operation) (S21: Yes), at Step S22, the controller 11 displays the input operation icon P1 in the second display form on the display screen 13A. For example, the controller 11 displays the input operation icon P1 in the second size and in the second color (black) on the display screen 13A (see FIG. 5). Step S21 is an example of an input operation detection step according to the present disclosure, and Step S22 is an example of a display step according to the present disclosure.

Subsequently, at Step S23, the controller 11 receives the selection operation of the input operation icon P1. For example, when the user closes the right hand RH on the virtual operation plane R2, the controller 11 receives the selection operation. When the selection operation is received, at Step S15, the controller 11 performs the process corresponding to the selection target on the display screen 13A. For example, as illustrated in FIG. 7, when the operation of selecting the selection button image of "Order" on the display screen 13A is received, the controller 11 executes the order process assigned to the selection button image of "Order". Step S23 is an example of a reception step according to the present disclosure.

At Step S31, when the controller 11 has not received the third gesture operation (S31: No), at Step S15, the controller 11 executes the input process corresponding to the input operation other than the first gesture operation to the third gesture operation. For example, when the controller 11 has received the drawing operation to draw a handwritten image from the user, the controller 11 executes the drawing process to draw the handwritten image on the display screen 13A.

As described above, the controller 11 executes the display control process.

As described above, the display device 1 according to the present embodiment receives a non-contact input operation by the user for the display screen 13A. The display device 1 detects input operations including the predetermined gesture operations of the user. The display device 1 displays the input operation icon P1 in the first display form on the display screen 13A when the first gesture operation of the user is detected and displays the input operation icon P1 in the second display form on the display screen 13A when the second gesture operation of the user is detected. The display device 1 receives the movement operation to move the input operation icon P1 in accordance with the first gesture operation when the first gesture operation is detected and receives the selection operation to select the selection target by the input operation icon P1 when the second gesture operation is detected. When the third gesture operation of the user is detected, the display device 1 changes the display form of the input operation icon P1. For example, the display form of the input operation icon P1 is gradually or continuously changed between the first display form and the second display form. The display device 1 calculates the degree of approximation between the third gesture operation and the first gesture operation and between the third gesture operation and the second gesture operation and changes the display form of the input operation icon P1 based on the calculated degree of approximation.

Specifically, the display device 1 displays the input operation icon P1 in a large size and moves the input operation icon P1 so as to follow the movement of the user's hand when the operation of opening the user's hand (the first gesture operation) is detected, and displays the input operation icon P1 in a small size and performs the selection operation by the input operation icon P1 when the operation of closing the user's hand (the second gesture operation) is detected. When the state (the third gesture operation) between the open state and the closed state of the user's hand is detected, the display device 1 displays the input operation icon P1 in the size corresponding to the degree of clenching Gn (the degree of approximation) of the user's hand and moves the input operation icon P1 so as to follow the movement of the user's hand.

With this configuration, the user may recognize that his/her gesture operation is becoming close to the shape (the shape of the clenched hand) corresponding to the second gesture operation (selection operation) from the shape (the shape of the opened hand) corresponding to the first gesture operation. This allows the user to have the shape corresponding to the first gesture operation again, which may thus prevent improper input due to an operation not intended by the user.

Method for Setting Virtual Operation Plane

The operation plane setter 111 may set the virtual operation plane R2 having a desired size at a desired position based on a predetermined setting gesture operation of the user.

Specifically, the operation plane setter 111 detects the setting gesture operation of the user. Specifically, the operation plane setter 111 detects the setting gesture operation based on the detection information acquired from the motion sensor 15. For example, the operation plane setter 111 specifies the shape of the user's hand based on the coordinate information included in the detection information and specifies the corresponding gesture operation among a plurality of gesture operations that are previously registered in the storage 12.

When a predetermined first setting gesture operation of the user is detected, the operation plane setter 111 sets the region corresponding to the first setting gesture operation as the virtual operation plane R2 for receiving the input operation of the user for the display screen 13A. The operation plane setter 111 may set the virtual operation plane R2 when the first setting gesture operation is performed continuously for a predetermined time. The first setting gesture operation is an operation to hold for example the respective palms of the left hand LH and the right hand RH to the display screen 13A. That is, the first setting gesture operation is a setting operation for the user to set the virtual operation plane R2.

Figure 9:
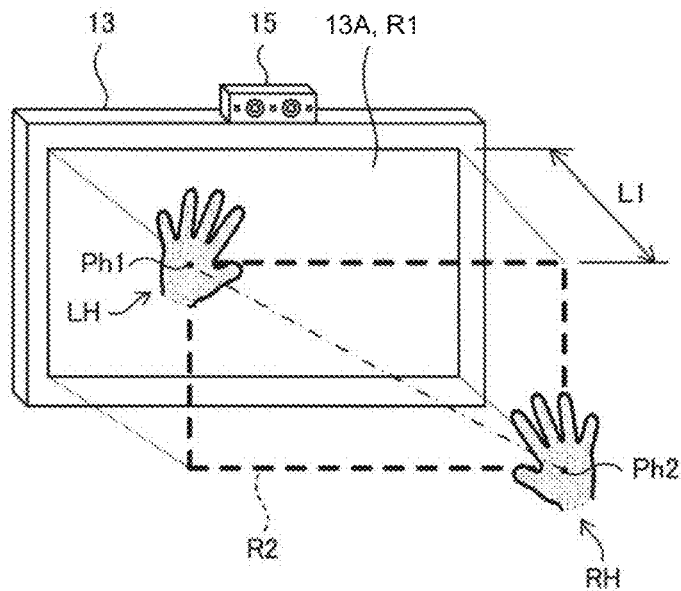
FIG. 9 is a diagram illustrating an example of a method for setting a virtual operation plane in the display device according to the embodiment of the present disclosure.

For example, as illustrated in FIG. 9, when the user holds the palm of the left hand LH to the display screen 13A at any upper left position and holds the palm of the right hand RH to the display screen 13A at any lower right position, the operation plane setter 111 detects coordinates Ph1 of the left hand LH, coordinates Ph2 of the right hand RH, and the first setting gesture operation of holding the left hand LH and the right hand RH based on the detection information acquired from the motion sensor 15. When the first setting gesture operation is detected, the operation plane setter 111 sets the virtual operation plane R2 based on the coordinates Ph1 of the left hand LH and the coordinates Ph2 of the right hand RH.

For example, as illustrated in FIG. 9, the operation plane setter 111 sets the rectangular virtual operation plane R2 having the line connecting the position (the coordinates Ph1) of the left hand LH and the position (the coordinates Ph2) of the right hand RH as a diagonal line. Specifically, the operation plane setter 111 calculates the coordinates C21 to C24 (see FIG. 2) of the corners of the rectangle based on the coordinates Ph1 of the left hand LH and the coordinates Ph2 of the right hand RH to set the virtual operation plane R2.

For example, the operation plane setter 111 sets the virtual operation plane R2 at a position away from the display screen 13A by a predetermined distance L1. The predetermined distance L1 is the distance corresponding to the coordinate Ph1 (the Z-coordinate) of the left hand LH and the coordinate Ph2 (the Z-coordinate) of the right hand RH.

Figure 10:
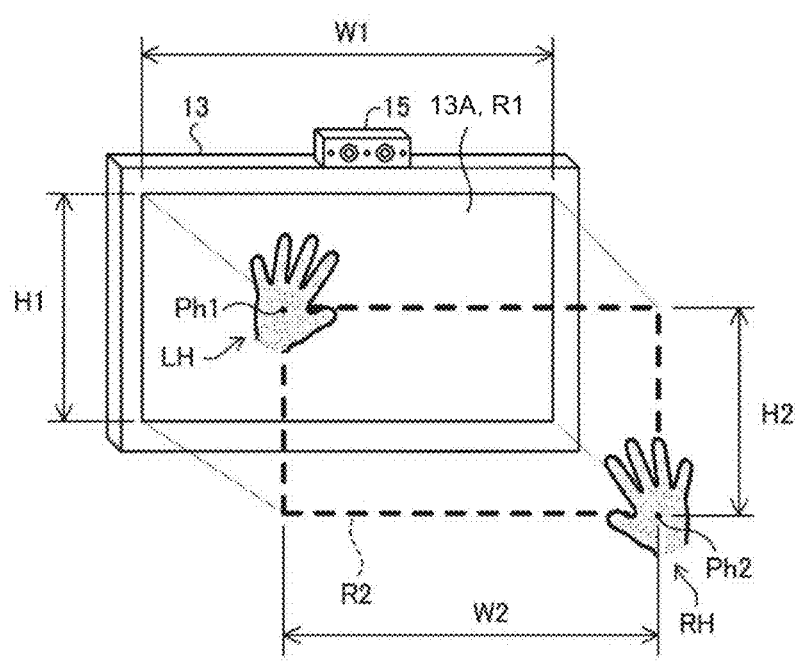
FIG. 10 is a diagram illustrating an example of the method for setting the virtual operation plane in the display device according to the embodiment of the present disclosure.

For example, the operation plane setter 111 may set the virtual operation plane R2 having the aspect ratio that is identical to the aspect ratio of the display screen 13A. Specifically, as illustrated in FIG. 10, the operation plane setter 111 sets the virtual operation plane R2 having the aspect ratio (H2:W2) that is identical to the aspect ratio (H1:W1) of the display screen 13A (H1:W1=H2:W2).

As described above, the size of the display screen 13A (the operation region R1) and the size of the virtual operation plane R2 may be identical or different. Here, the virtual operation plane R2 smaller than the operation region R1 is suitable for the application in which the large-sized display panel 13 is operated close at the user's hand. Conversely, the virtual operation plane R2 larger than the operation region R1 is suitable for the application in which the small-sized display panel 13 is operated at a distant position.

Figure 11:
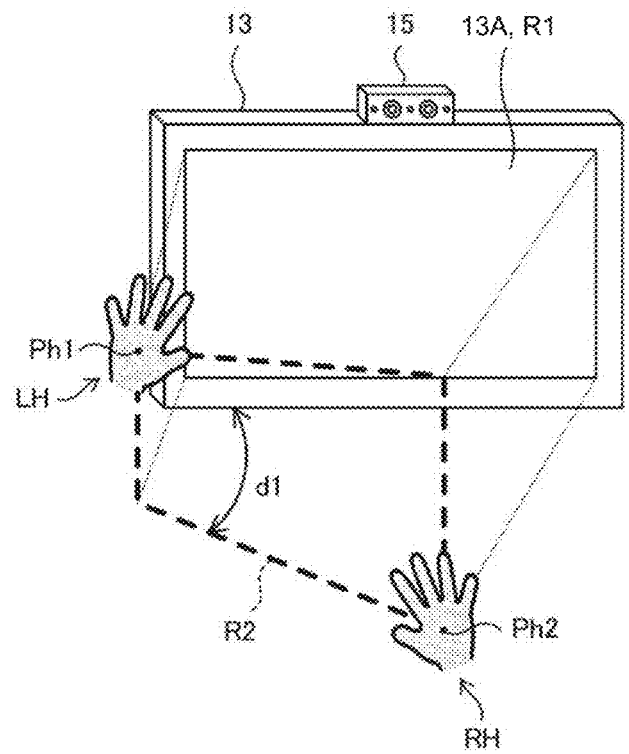
FIG. 11 is a diagram illustrating an example of the method for setting the virtual operation plane in the display device according to the embodiment of the present disclosure.

As illustrated in FIG. 11, the operation plane setter 111 may set the virtual operation plane R2 having a predetermined angle d1 that is not parallel to the display screen 13A. That is, the virtual operation plane R2 may be set in an oblique direction with respect to the display screen 13A. For example, the operation plane setter 111 sets the predetermined angle d1 based on the coordinate Ph1 (the Z-coordinate) of the left hand LH and the coordinate Ph2 (the Z-coordinate) of the right hand RH. Thus, the user may perform the input operation in an oblique direction with respect to the display screen 13A. The operation plane setter 111 may display information on the predetermined angle d1 on the display screen 13A. This allows the user to perceive the angle (the degree of inclination) of the virtual operation plane R2 with respect to the display screen 13A.

Figure 12:
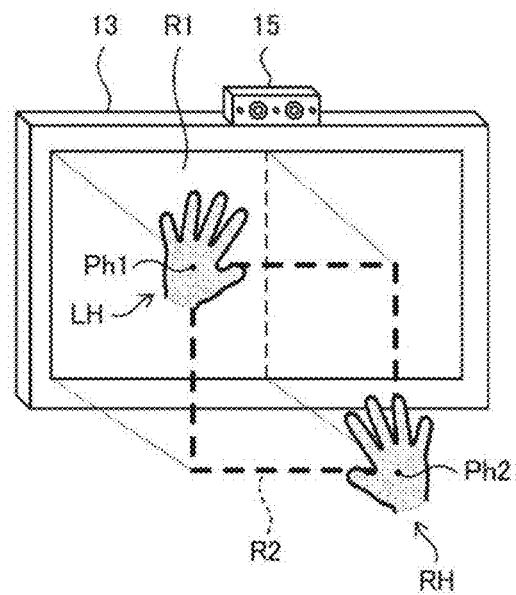
FIG. 12 is a diagram illustrating an example of the method for setting the virtual operation plane in the display device according to the embodiment of the present disclosure.
Figure 13:
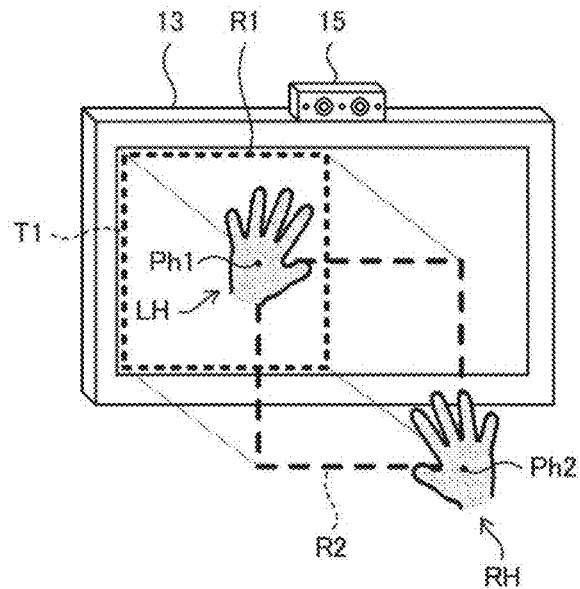
FIG. 13 is a diagram illustrating an example of the method for setting the virtual operation plane in the display device according to the embodiment of the present disclosure.

The operation plane setter 111 may set the virtual operation plane R2 corresponding to a part of the region of the display screen 13A. For example, as illustrated in FIG. 12, the operation plane setter 111 sets the virtual operation plane R2 corresponding to the operation region R1 that is a part (a left region) of the display screen 13A. The position and size of the operation region R1 may be set by the user's setting operation. Here, in order for the user who sets the virtual operation plane R2 to easily perceive the operation region R1, as illustrated in FIG. 13, the operation plane setter 111 may display an object image T1 indicating the operation region R1 on the display screen 13A when the virtual operation plane R2 is set.

The operation plane setter 111 may use well-known coordinate transformation (projective transformation, affine transformation, etc.) to set the virtual operation plane R2 associated with the operation region R1 of the display screen 13A based on the coordinates corresponding to the first setting gesture operation.

The operation plane setter 111 may execute a process to adjust the set virtual operation plane R2. Specifically, when a predetermined second setting gesture operation of the user is detected after the virtual operation plane R2 is set, the operation plane setter 111 changes at least any of the size and position of the virtual operation plane R2 based on the second setting gesture operation. The second setting gesture operation is, for example, a pointing operation (see FIG. 14) by the right hand RH.

Figure 14:
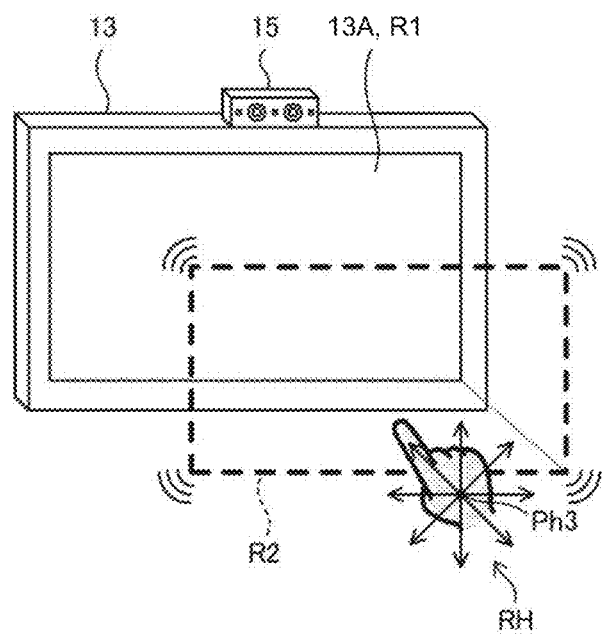
FIG. 14 is a diagram illustrating an example of the method for setting the virtual operation plane in the display device according to the embodiment of the present disclosure.

For example, as illustrated in FIG. 14, when the user performs a pointing operation at the display screen 13A by the right hand RH after the virtual operation plane R2 is set, the operation plane setter 111 detects coordinates Ph3 of the right hand RH and the second setting gesture operation that is a pointing operation by the right hand RH based on the detection information acquired from the motion sensor 15. When the second setting gesture operation is detected, the operation plane setter 111 sets the virtual operation plane R2 so as to move based on the coordinates Ph3 of the right hand RH and receives the movement operation of the virtual operation plane R2 by the user. For example, when the user moves the right hand RH leftward while keeping a pointed state, the operation plane setter 111 moves the virtual operation plane R2 leftward by the amount corresponding to the movement amount of the right hand RH. That is, the operation plane setter 111 sets the virtual operation plane R2 at the coordinates Ph3 of the right hand RH after the movement.

Figure 15:
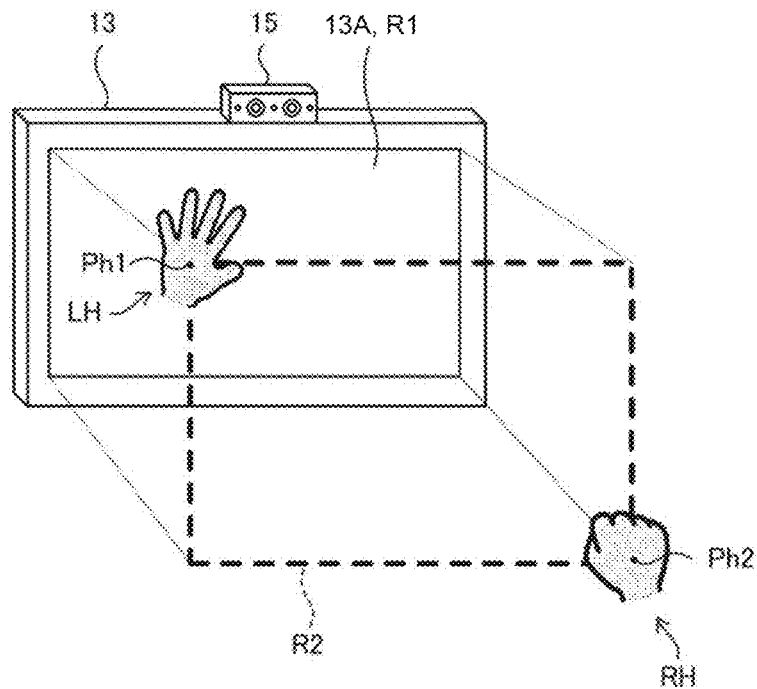
FIG. 15 is a diagram illustrating an example of the method for setting the virtual operation plane in the display device according to the embodiment of the present disclosure.

As illustrated in FIG. 15, for example, when the user performs the operation to clench the fist of the right hand RH while holding the left hand LH after the virtual operation plane R2 is set, the operation plane setter 111 detects the coordinates Ph1 of the left hand LH, the coordinates Ph2 of the right hand RH, and the second setting gesture operation of holding the left hand LH and clenching the right hand RH based on the detection information acquired from the motion sensor 15. When the second setting gesture operation is detected, the operation plane setter 111 sets the size of the virtual operation plane R2 so as to be changed based on the coordinates Ph2 of the right hand RH and receives the change operation for the size of the virtual operation plane R2 by the user. For example, when the user moves the right hand RH in a lower-right direction while clenching the fist, the operation plane setter 111 enlarges the size (area) of the virtual operation plane R2 by the amount corresponding to the movement amount of the right hand RH. That is, the operation plane setter 111 sets the virtual operation plane R2 defined by the coordinates Ph1 of the left hand LH and the coordinates Ph2 of the right hand RH after the movement.

Figure 16:
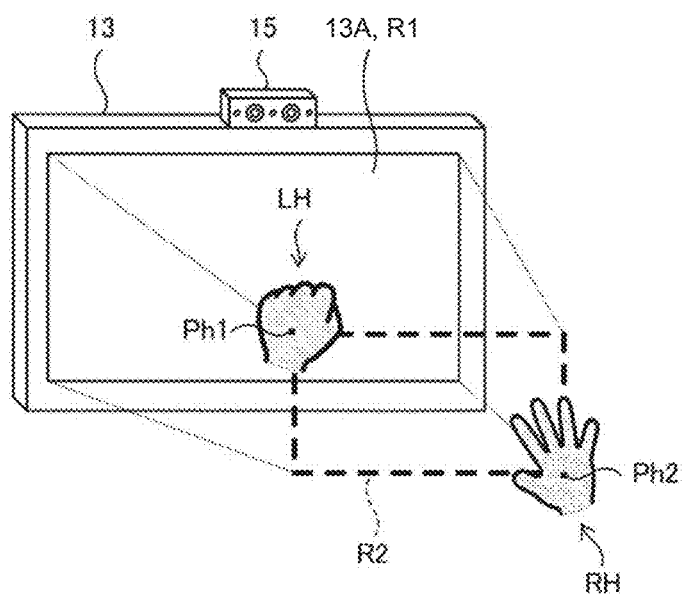
FIG. 16 is a diagram illustrating an example of the method for setting the virtual operation plane in the display device according to the embodiment of the present disclosure.

FIG. 16 illustrates an example of the case where the user performs the operation to clench the fist of the left hand LH while holding the right hand RH after the virtual operation plane R2 is set. In this case, the operation plane setter 111 detects the coordinates Ph1 of the left hand LH, the coordinates Ph2 of the right hand RH, and the second setting gesture operation of holding the right hand RH and clenching the left hand LH based on the detection information acquired from the motion sensor 15. When the second setting gesture operation is detected, the operation plane setter 111 sets the size of the virtual operation plane R2 so as to be changed based on the coordinates Ph1 of the left hand LH and receives the change operation for the size of the virtual operation plane R2 by the user. For example, when the user moves the left hand LH in a lower-right direction while clenching the fist, the operation plane setter 111 reduces the size (area) of the virtual operation plane R2 by the amount corresponding to the movement amount of the left hand LH. That is, the operation plane setter 111 sets the virtual operation plane R2 defined by the coordinates Ph2 of the right hand RH and the coordinates Ph1 of the left hand LH after the movement.

Figure 17:
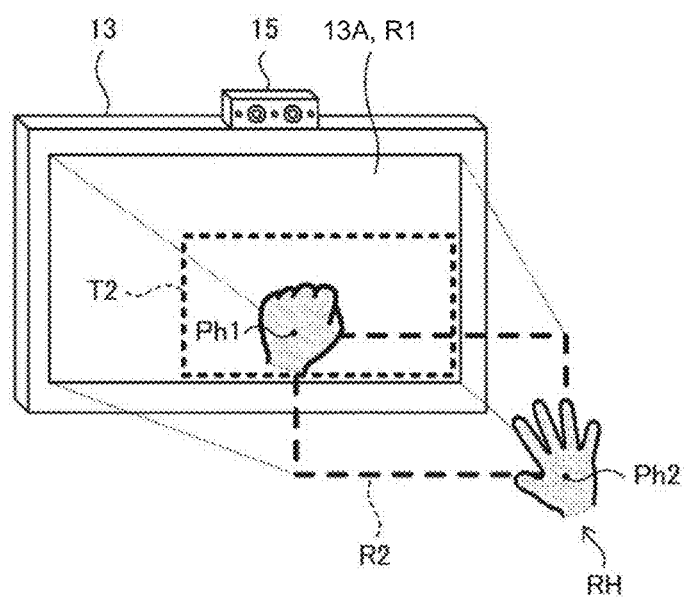
FIG. 17 is a diagram illustrating an example of the method for setting the virtual operation plane in the display device according to the embodiment of the present disclosure.

When the second setting gesture operation is detected after the virtual operation plane R2 is set, the operation plane setter 111 may display an object image T2 indicating the virtual operation plane R2 on the display screen 13A in accordance with the second setting gesture operation. FIG. 17 illustrates an example of the object image T2 indicating the virtual operation plane R2 after the size is changed. With this configuration, the user may visually perceive the size, position, and the like, of the virtual operation plane R2 after the change.

The display device according to the present disclosure may be configured by flexibly combining the embodiments described above or by modifying or partially omitting the embodiments as appropriate within the scope of the disclosure set forth in each claim.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display device that receives a non-contact input operation of a user for a display screen, the display device comprising:
an input operation detector that detects an input operation including a predetermined gesture operation of the user;
a display processor that displays an input operation icon in a first display form on the display screen when the input operation detector detects a first gesture operation of the user and displays the input operation icon in a second display form on the display screen when the input operation detector detects a second gesture operation of the user;
a reception processor that receives a movement operation to move the input operation icon in accordance with the first gesture operation when the input operation detector detects the first gesture operation and receives a selection operation to select a selection target by the input operation icon when the input operation detector detects the second gesture operation; and
a change processor that, when the input operation detector detects a third gesture operation of the user, gradually or continuously changes a display form of the input operation icon between the first display form and the second display form based on a state of change of the third gesture operation, the third gesture operation being a gesture operation between the first gesture operation and the second gesture operation during a change from the first gesture operation to the second gesture operation, or vice versa.

2. The display device according to claim 1, wherein the change processor gradually or continuously changes a size of the input operation icon between the first display form and the second display form.

3. The display device according to claim 1, wherein the change processor gradually or continuously changes a color of the input operation icon between the first display form and the second display form.

4. The display device according to claim 1, wherein the change processor gradually or continuously changes a shape of the input operation icon between the first display form and the second display form.

5. The display device according to claim 1, wherein when the third gesture operation is detected, the reception processor receives a movement operation to move the input operation icon in accordance with the third gesture operation.

6. The display device according to claim 1, further comprising an input processor that executes an input process corresponding to the input operation of the user on the display screen when the reception processor receives the movement operation and the selection operation.

7. The display device according to claim 1, further comprising a calculation processor that, when the input operation detector detects the third gesture operation of the user, calculates a first degree of approximation between the third gesture operation and the first gesture operation and a second degree of approximation between the third gesture operation and the second gesture operation, wherein
the change processor gradually or continuously changes the display form of the input operation icon between the first display form and the second display form based on the first and the second degree of approximations calculated by the calculation processor.

8. The display device according to claim 7, wherein
the input operation detector detects the first gesture operation, the second gesture operation, and the third gesture operation based on hand and finger information about at least any of a skeleton, an angle, and a position of a hand and fingers of the user, and
the calculation processor calculates the first and the second degree of approximations based on the hand and finger information.

9. The display device according to claim 7, wherein
the first gesture operation is an operation to open a hand of the user,
the second gesture operation is an operation to clench the hand of the user, and
the first and the second degree of approximations are an index indicating a degree of clenching of the hand of the user.

10. A display method for receiving a non-contact input operation of a user for a display screen, the display method causing one or more processors to execute:
detecting an input operation including a predetermined gesture operation of the user;
displaying an input operation icon in a first display form on the display screen when a first gesture operation of the user is detected and displaying the input operation icon in a second display form on the display screen when a second gesture operation of the user is detected;
receiving a movement operation to move the input operation icon in accordance with the first gesture operation when the first gesture operation is detected and receiving a selection operation to select a selection target by the input operation icon when the second gesture operation is detected; and
gradually or continuously changing, when a third gesture operation of the user is detected, a display form of the input operation icon between the first display form and the second display form based on a state of change of the third gesture operation, the third gesture operation being a gesture operation between the first gesture operation and the second gesture operation during a change from the first gesture operation to the second gesture operation, or vice versa.

11. A non-transitory computer-readable recording medium having recorded therein a display program that receives an non-contact input operation of a user for a display screen, the display program causing one or more processors to execute:
detecting an input operation including a predetermined gesture operation of the user;
displaying an input operation icon in a first display form on the display screen when a first gesture operation of the user is detected and displaying the input operation icon in a second display form on the display screen when a second gesture operation of the user is detected;
receiving a movement operation to move the input operation icon in accordance with the first gesture operation when the first gesture operation is detected and receiving a selection operation to select a selection target by the input operation icon when the second gesture operation is detected; and
gradually or continuously changing, when a third gesture operation of the user is detected, a display form of the input operation icon between the first display form and the second display form based on a state of change of the third gesture operation, the third gesture operation being a gesture operation between the first gesture operation and the second gesture operation during a change from the first gesture operation to the second gesture operation, or vice versa.

* * * * *